United States Patent [19]
Thomson

[11] Patent Number: 5,600,782
[45] Date of Patent: Feb. 4, 1997

[54] CAN INTERFACE WITH ENHANCED FAULT CONFINEMENT

[75] Inventor: Thomas W. S. Thomson, Santa Cruz, Calif.

[73] Assignee: National Semiconductor Corporation, Santa Clara, Calif.

[21] Appl. No.: 321,351

[22] Filed: Oct. 11, 1994

Related U.S. Application Data

[63] Continuation-in-part of Ser. No. 111,383, Aug. 24, 1993.

[51] Int. Cl.[6] .................................................. G06F 11/00
[52] U.S. Cl. ................................. 395/182.02; 395/185.02
[58] Field of Search ........................ 395/182.02, 185.01, 395/185.1, 185.02

[56] References Cited

U.S. PATENT DOCUMENTS

| | | | |
|---|---|---|---|
| 5,111,460 | 5/1992 | Botzenhardt et al. | 395/185.1 |
| 5,357,518 | 10/1994 | Peter | 395/182.02 |
| 5,448,180 | 9/1995 | Kienzler et al. | 326/15 |

FOREIGN PATENT DOCUMENTS

| | | |
|---|---|---|
| 0290129 | 11/1988 | European Pat. Off. . |
| 8909976 | 10/1989 | WIPO . |

OTHER PUBLICATIONS

A. Raab, "Can—Controller Area Network." *Elector Electronics*, vol. 18, No. 203 (Sep. 1992), Canterbury GB, pp. 56–59.

Robert Bosch GmbH, "CAN Specification, Version 2.0", Sep. 1991, pp. Part B—33 through Part B—68.

Philips Semiconductors, "Preliminary Product Specification, Version 2.0", Jun. 1992, pp. 1 through 58.

Motorola Ltd., Motorola Product Specification Booklet, "MC68HC05X4, MC68HC705X4: High–Density Complementary Metal Oxide Semiconductor (HCMOS) Microprocessor Unit", 1992, 81 pgs.

Kevin Hare, Julian Powell, and Peter Zimmermann, "Fault Confinment of the CAN Protocol", 1991, pp. 1–15.

Intel Product Review, "82527 Serial Communications Controller Product Preview", Aug. 1992, pp. 1–59.

*Primary Examiner*—Robert W. Beausoliel, Jr.
*Assistant Examiner*—Joseph E. Palys
*Attorney, Agent, or Firm*—Skjerven, Morrill, MacPherson, Franklin & Friel

[57] ABSTRACT

A CAN node having an enhanced fault recovery system is disclosed. The CAN node includes a CAN protocol controller device which reconnects to a CAN bus from the node's busoff state only after the node has successfully decoded 128 good messages from other devices on the CAN bus. Such a system advantageously provides a CAN node which exits its busoff state with a high degree of confidence that the fault that caused the node to enter the busoff state has been cleared. The protocol controller device uses the eleven recessive bits that start at the acknowledgement delimiter and finish at the end of the third bit of intermission to recognize that a single message has been successfully decoded.

8 Claims, 8 Drawing Sheets

CAN INTERFACE WITH ENHANCED FAULT CONFINEMENT

CROSS-REFERENCE TO RELATED APPLICATION

This application is a continuation-in-part application of U.S. Ser. No. 08/111,383, which was filed on Aug. 24, 1993.

FIELD OF THE INVENTION

This invention relates to a serial interface for automotive applications. More particularly, this invention relates to a CAN interface.

BACKGROUND INFORMATION

The Controller Area Network (CAN) protocol is a serial communication protocol for communicating between various electronic devices of a vehicle such as an automobile. In accordance with the CAN protocol, multiple different electronic devices of a vehicle can be coupled to a single serial bus such that messages and data may be sent from one electronic device of the vehicle to another. The CAN protocol is a message based protocol in which CAN frames are placed on a common CAN bus. The CAN bus may be a single wire or may be a differentially driven pair of wires. Each electronic device ("node") on the common CAN bus receives each frame present on the bus and filters out those frames which are not required in performing that node's tasks. For example, if a device associated with an automobile dashboard sends onto the CAN bus a frame requesting that the automobile headlights be turned on, then the device on the CAN bus responsible for the brake lights can determine that the frame is intended for another node and therefore will not act upon the frame. The device controlling the headlights, however, receives and acts upon the frame by turning the headlights on. Identifier bits are therefore provided in CAN frames to allow messages and data to be directed to certain nodes on the CAN bus and not to other nodes on the CAN bus.

FIGS. 1A–D (Prior Art) are diagrams illustrating four different types of CAN frames. In FIGS. 1A–D, an "r" designates a bit having recessive logic level and a "d" designates a bit having a dominant logic level. If one node places a dominant bit on the bus at the same time that another node places a recessive bit on the bus, the bus will assume the logic level of the dominant bit. By monitoring the voltage level on the bus, the node attempting to transmit the recessive bit is able to determine that the bus is not idle but rather that traffic exists on the bus. Additionally, between each frame is a 3-bit intermission field, each bit of which is 'recessive'.

Figure 1A:
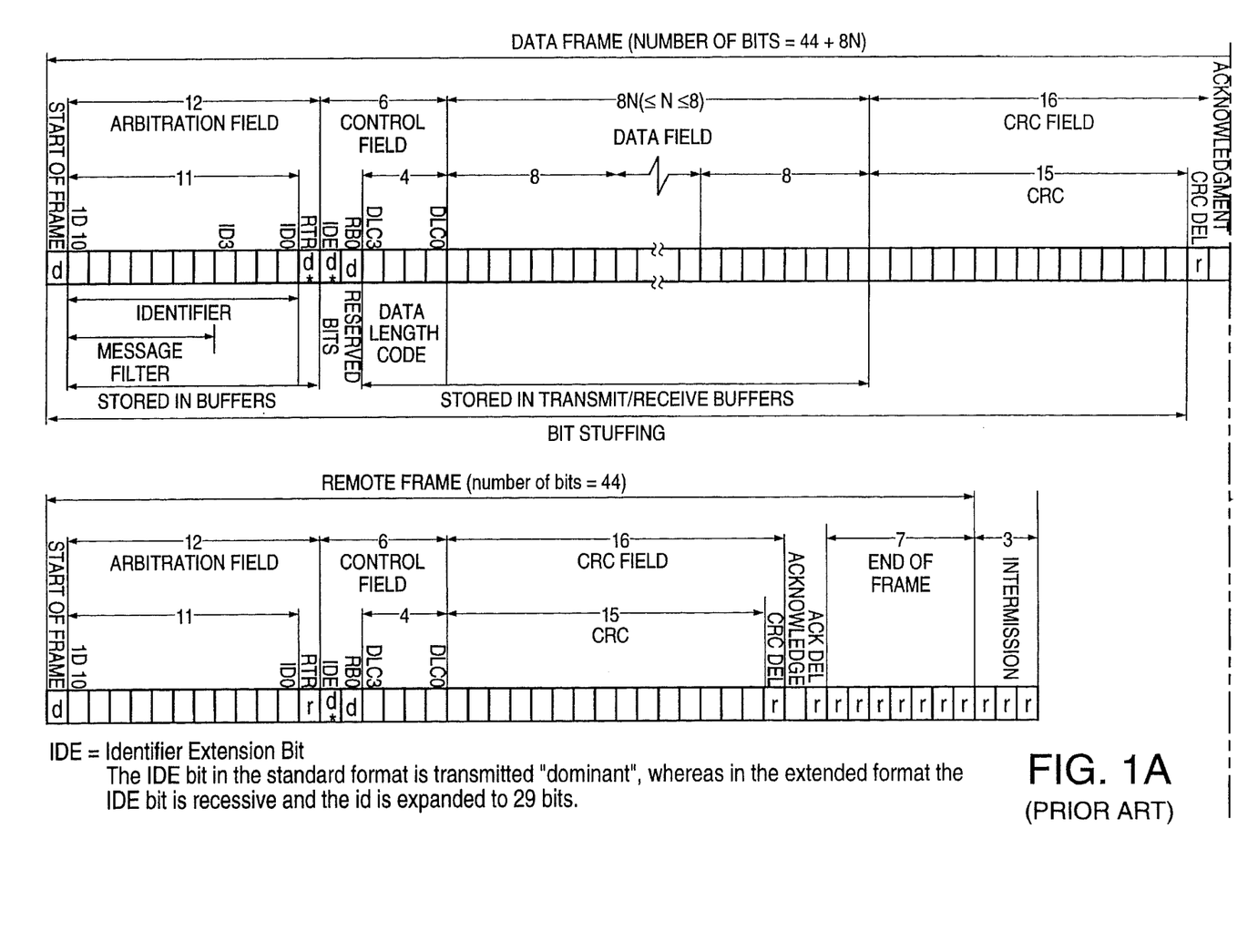
FIGS. 1A–1D (Prior Art) are diagrams illustrating a CAN data frame, a CAN remote frame, a CAN error frame, and a CAN overload frame.

FIG. 1A is a diagram of a CAN data frame. Data frames are used to transmit information such as data and/or messages from one node to another node over the CAN bus. The data frame of FIG. 1A includes a start of frame bit, a 12-bit arbitration field, a 6-bit control field, a data field, a 16-bit cyclic redundancy check (CRC) field, a 2-bit acknowledgement field and a 7-bit end of frame field. The arbitration field includes an 11-bit identifier and a remote transmission request (RTR) bit, which, for a data frame, is 'dominant'. The data field includes up to eight bytes of data. A message may, for example be encoded in the date field.

Figure 1B:
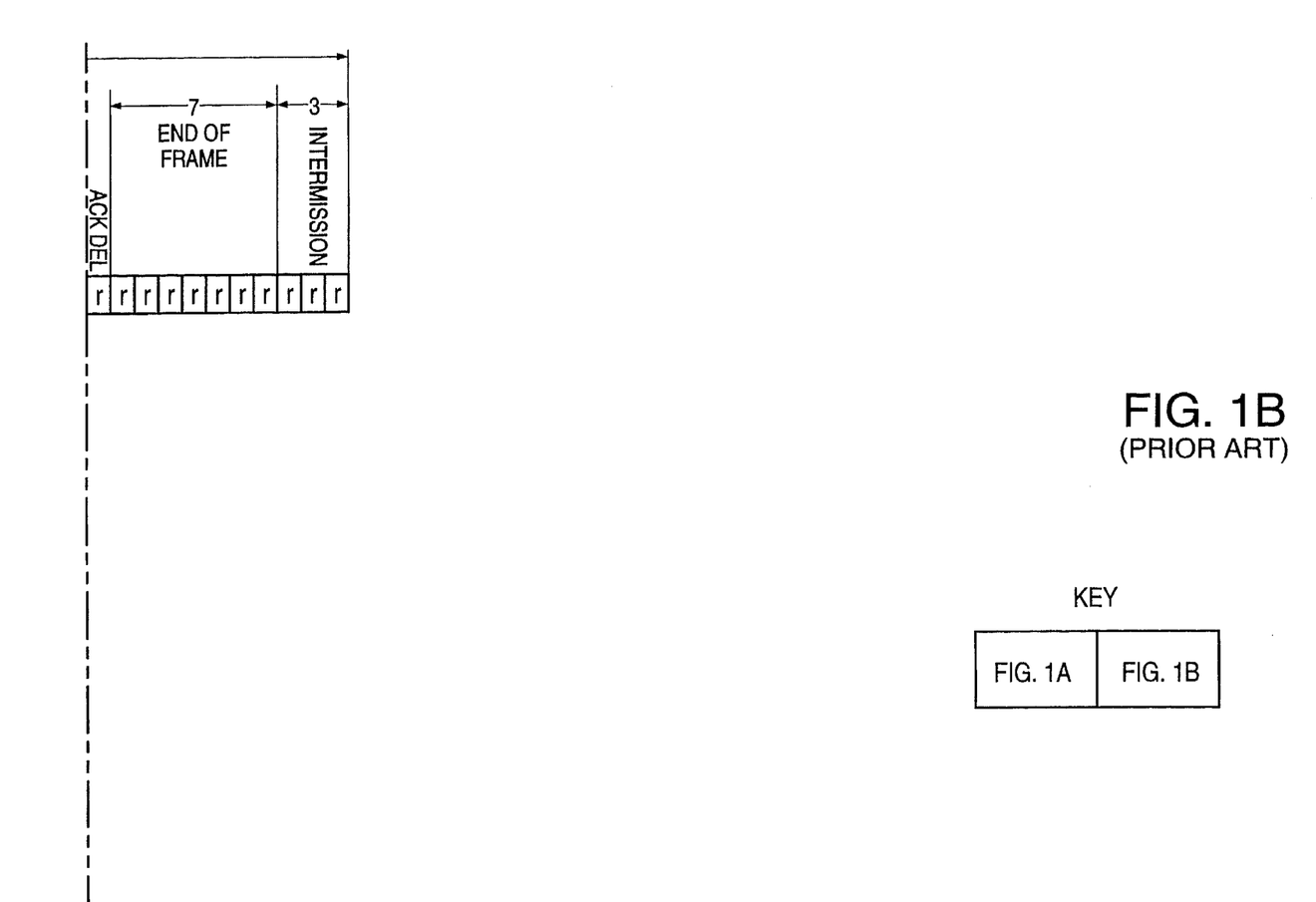

FIG. 1B is a diagram of a CAN remote frame. A remote frame is used to request data from other CAN nodes. A remote frame is identical to a data frame except that the remote transmission request (RTR) bit of the arbitration field is 'recessive' and there is no data field.

Figure 1C:
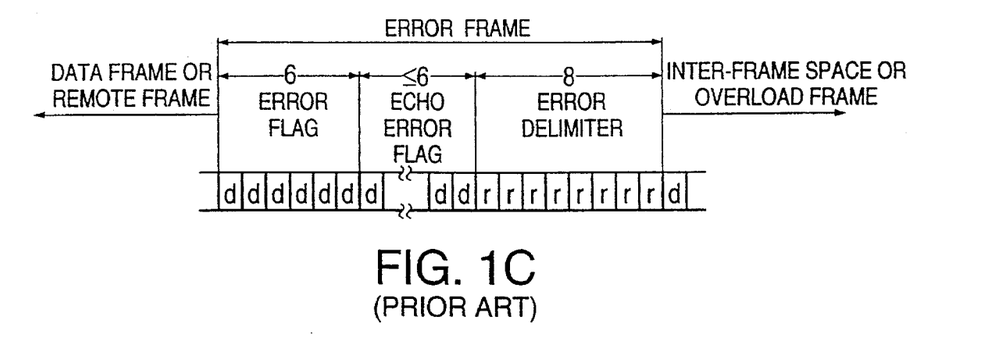

FIG. 1C is a diagram of a CAN error frame. Error frames are used to communicate error conditions detected on the CAN bus to other nodes. An error frame can start anywhere in the middle of another frame. Nodes that signal an error frame do so by either sending six recessive bits or six dominant bits. Nodes that receive the error frame distinguish it by receiving data that does not obey the rules of "bit stuffing". So after six error bits, the receiving node signals that it has seen an error and begins sending its own error frame. Consequently, there can be 12 dominant bits on the CAN bus, six bits of which come from the sender of the error flag and six bits of which come from the receiver of the error flag.

Figure 1D:
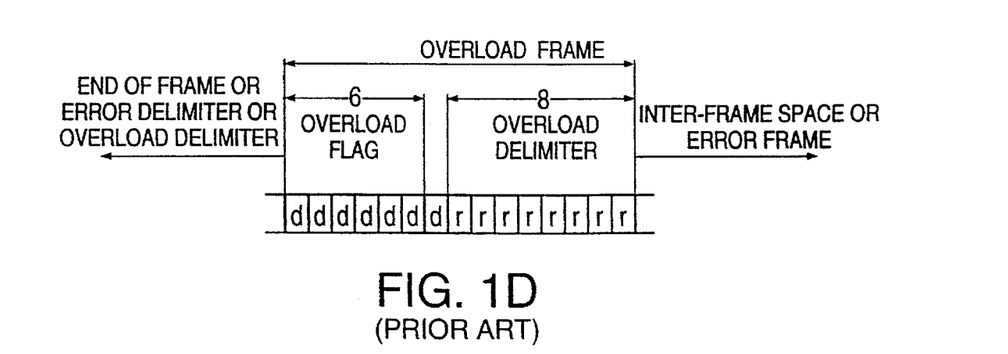

FIG. 1D is a diagram of a CAN overload frame. An overload frame is used to indicate that a receiving node is not able to process all the information sent to it over the CAN bus. An overload frame can only start at the end of another frame. Nodes that wish to slow the flow of information on the CAN bus do so by sending an "overload frame" at the end of a data frame. The overload frame is similar to an error frame bus since an overload frame can only be initiated at the end of a message, receiving nodes can distinguish the overload frame from an error frame and leave their fault confinement logic untouched. Receiving nodes see the start of an overload frame immediately since "bit stuffing" does not apply at the end of the message and therefore there may be up to seven bits in an overload frame.

Using these four types of frames, information can be passed back and forth between the various devices (nodes) coupled to a CAN bus.

The CAN protocol provides for fault confinement in which CAN nodes are able to distinguish short disturbances from permanent failures. Defective nodes are switched to a busoff state. During the busoff state, no messages can be transmitted by the node. During the busoff state, messages can be monitored by the node for correctness, i.e., for whether a message is error free; however, the content of the message is ignored. A node which is in the busoff state is permitted to switch to an error active state when certain conditions are met.

A node enters the error active state, in which the node's error counters are both set to zero, after 128 occurrences of eleven consecutive recessive bits having been monitored on the bus. A node also enters the error active state at power-on or reset. The eleven consecutive recessive bits are provided by the 1-bit acknowledge delimiter field, the 7-bit end of frame field and the 3-bit intermission field or by recessive bits that are present when the bus is in idle state. The 11 recessive bits starting from the acknowledge delimiter can only be decoded if a message has been correctly decoded including the cyclic redundancy check without error.

Recessive bits are automatic when the bus is in the idle state; i.e., when the bus is not being used, the state of the bus is recessive and appears to all receivers as a succession of recessive bits which receivers count in groups of 11 bits. Accordingly, when the bus is in an idle state, 128*11 recessive bits are provided by the total of all the intermessage spaces. That is all of the time between messages are added up to form the total quiet time. When the total quiet time exceeds 128*11 bit times, the device can leave the busoff state. Ten or less recessive bits during the idle time between messages does not count towards the total quite time. Under the fault confinement portion of the CAN protocol, a node waits for 128 groups of 11 recessive bits regardless of where they are relative to messages appearing on the network. Thus, a bus which is in the idle state provides any node which is in the busoff state with a time out condition that switches the node back to the error active state.

Figure 2:
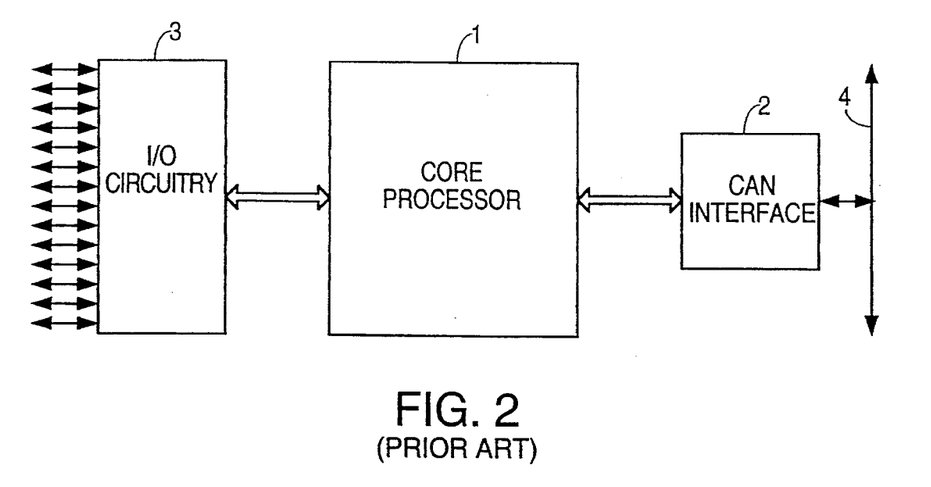
FIG. 2 (Prior Art) is a block diagram of a typical conventional electronic device coupled to a CAN bus in an automobile.

FIG. 2 is an illustration of a typical electronic device coupled to a CAN bus in a vehicle. The device includes a core processor 1, an associated CAN interface 2, and input/output circuitry 3. The input/output circuitry 3 couples the core processor to the vehicle. The input/output circuitry 3 may, for example, be coupled to actuators and sensors which are part of a control loop. The input/output circuitry 3 may include input/output circuitry such as drivers, amplifiers, buffers, registers, timers, A/D converters, and D/A converters disposed on a single integrated circuit chip with the processor core. The input/output circuitry may also include input/output circuitry not realized on the same integrated circuit as the processor core. The CAN interface 2 couples the core processor 1 to a CAN bus 4.

In one CAN interface of the prior art, communication transactions are handled by the CAN interface. In order to transmit a message, the core processor places the data field of a frame to be transmitted into a transmit buffer of the CAN interface 2 which is adequately long to hold the data field. The core processor 1 than sets a designated bit in the CAN interface which indicates to the CAN interface that a frame containing the information in the transmit buffer is to be transmitted. The CPU is then free to attend to other tasks while the CAN interface transmits the frame. The CAN interface determines that the bus is idle and then transmits the frame, the bits of the data field being sent from the transmit buffer in the CAN interface. Similarly, when a frame is to be received, the CAN interface receives the entire data field of the frame into a single receive buffer in the CAN interface which is adequately long to hold the received data field. Only if the frame was received error free does the CAN interface alert the core processor. If any transmission error occurs, the CAN interface handles the error in accordance with the CAN protocol without requiring any action by the core processor. The core processor is therefore able to read the complete correctly received data field from the receive buffer of the CAN interface.

In one known system which implements the CAN fault confinement protocol, when a node detects that a reset request signal has been set, the node aborts the current transmission or reception of a message and enters a reset state. The reset request signal may be generated either by an external reset or by a central processing unit within the core processor. The CAN interface controller starts normal operation in one of two ways upon detecting the reset request signal. If the reset request signal was generated by an external reset, then the CAN interface controller starts normal operation after the first occurrence of eleven recessive bits. Alternately, the CAN interface controller starts normal operation after the first occurrence of eleven recessive bits if the reset request is cleared by the central processing unit unless bus status (BS) is already set. If the BS signal is set, which indicates that the device is not participating in bus activities (i.e., that the node is in the busoff state), then the CAN interface controller waits for the 128th occurrence of eleven recessive bits before starting normal operation.

In another system, a software initialization procedure is started by setting an initialization bit in a control register either by software reset, hardware reset or by going busoff. While the initialization bit is set, all message transfers to and from the node are stopped and the transmit outputs are recessive. The error counters are unchanged. Initialization is used to configure the node without risk of CAN bus receptions or transmissions. Resetting the initialization bit completes initialization and the node synchronizes itself to the CAN bus by waiting for eleven consecutive recessive bits before the node will take part in bus activities. Busoff recovery cannot be hastened by setting or resetting the initialization bit. If the node goes busoff, the node sets the initialization bit itself and thereby stops its bus activities. Once the initialization bit is cleared by the central processing unit, the node waits for 128 occurrences of eleven consecutive recessive bits, before resuming normal operation. During the initialization sequence, each time a recessive bit is received, an error code is written to the status register enabling the CPU to readily check whether or not the CAN bus is stuck in a dominant state.

SUMMARY OF THE INVENTION

It has been discovered that providing a CAN node with a CAN protocol controller device which reconnects to a CAN bus from the node's busoff state only after the node has successfully decoded 128 good messages from other devices on the CAN bus advantageously provides a CAN protocol controller device which exits its busoff state with a high degree of confidence that the fault that caused the node to enter the busoff state has been cleared. The protocol controller device uses the eleven recessive bits that start at the acknowledgement delimiter and finish at the end of the third bit of intermission to recognize that a single message has been successfully decoded.

DETAILED DESCRIPTION

The following sets forth a detailed description of the best contemplated mode for carrying out the invention. The description is intended to be illustrative of the invention and should not be taken to be limiting.

Figure 3:
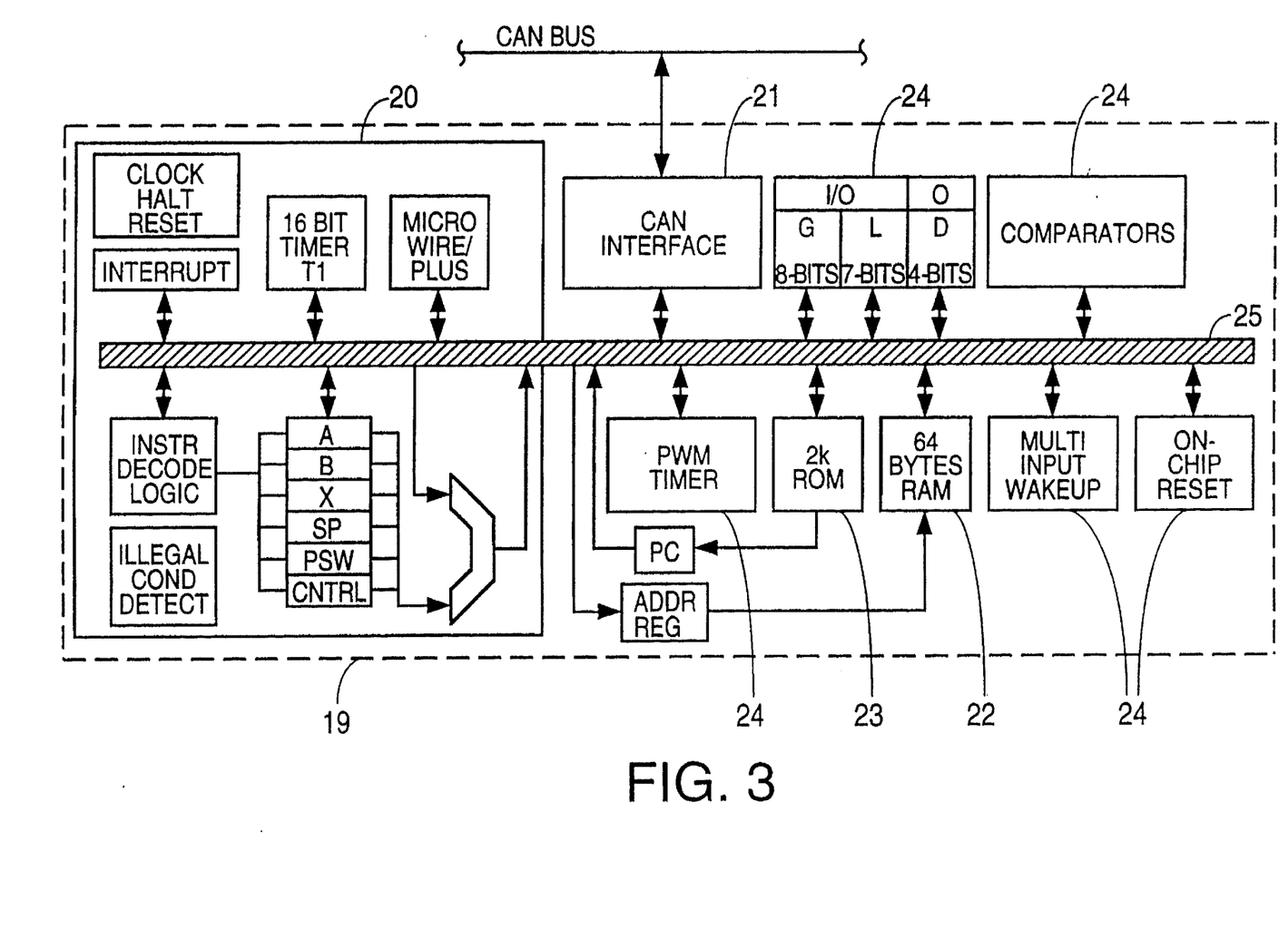
FIG. 3 is a block diagram of a CAN node in accordance with one embodiment of the present invention.

Referring to FIG. 3, integrated circuit 19 provides an implementation of a CAN node in accordance with one embodiment of the present invention. The integrated circuit 19 includes a core processor 20 which is coupled to a CAN interface 21, a random access memory (RAM) 22 (RAM 22 may be considered part of the core processor 20), a read only memory (ROM) 23 (ROM 23 may be considered part of the core processor 20), and input/output circuitry 24 by an internal serial bus 25. In one embodiment, the integrated circuit is a single chip, 8-bit, fully static, CMOS microcontroller fabricated using double-metal silicon gate CMOS technology and packaged in a 20-pin or 28-pin dual-in-line surface mount package. Core processor 20 stores program memory in ROM 23 which is separated from data memory in RAM 22. The core processor has registers including a 15-bit program counter register PC, an 8-bit accumulator A, an 8-bit RAM address pointer B which can be optionally post auto incremented or decremented, an alternate 8-bit RAM address pointer X which can also be optionally post auto incremented or decremented, an 8-bit stack pointer SP which points to the subroutine/interrupt stack in RAM 22 and which is initialized to RAM address 02F hex on reset, an 8-bit PSW register used for communication and control, and an 8-bit control register CNTRL register. All core processor registers except A and PC are memory mapped.

Figure 4:
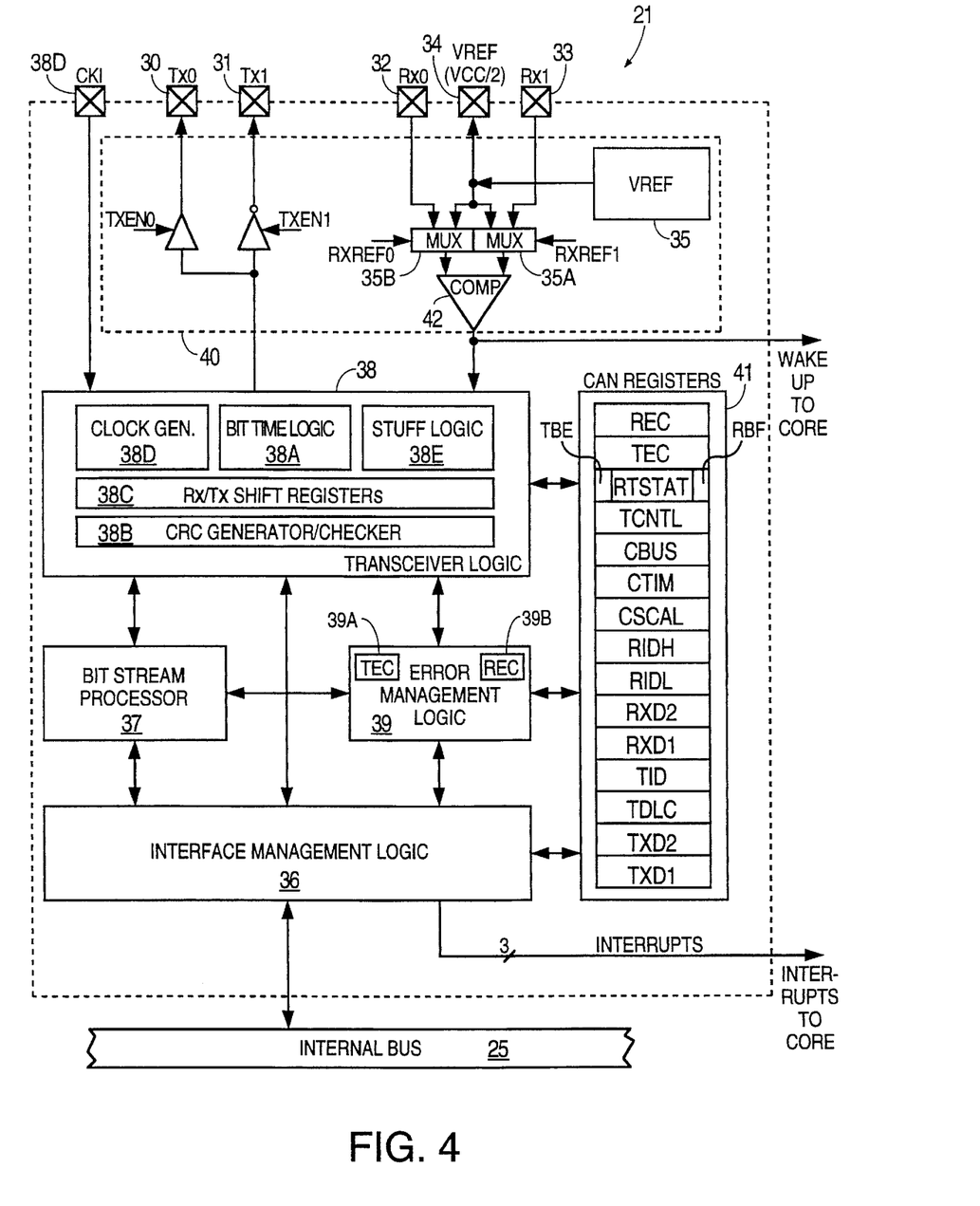
FIG. 4 is a block diagram of a CAN interface circuit of the FIG. 3 CAN node in accordance with the present invention.

Referring to FIG. 4, CAN interface 21 is coupled to internal bus 25. The CAN interface 21 includes a TX0 output pin 30, a TX1 output pin 31, a RX0 input pin 32, a RX1 input pin 33, and a voltage reference output pin 34 designated VREF. The VREF pin 34 provides an access to an on-chip voltage reference 35 which supplies a reference voltage output of VCC/2.

The transmit buffer of CAN interface 21 has two registers TXD1 and TXD2. Each register is 8-bits in length. If, for example, more than two data field bytes are to be transmitted by the CAN interface in one frame, then software executing in the core processor writes successive bytes of the data field to the two CAN data transmit registers TXD1 and TXD2 at the appropriate time so that the entire data field is transmitted properly from the CAN interface. Software executing in the core processor may poll a dedicated transmit buffer empty (TBE) bit at address 00BC to determine when two successive data field bytes of the frame should be written to the two CAN data transmit registers TXD1 and TXD2. Alternatively, the CAN interface can be configured to generate a hardware interrupt to the core processor to indicate to the core processor that an additional byte or bytes of the data field should be written to the two CAN data transmit registers TXD1 and TXD2.

Similarly, the receive buffer of CAN interface 21 has two registers RXD1 and RXD2. If, for example, more than two data field bytes are to be received over the CAN bus by the CAN interface, then software executing in the core processor must read the first bytes of the data field from two CAN data transmit registers RXD1 and RXD2 before the two receive registers of the CAN interface are overwritten with subsequently received data bytes of the frame. Software executing in the core processor may poll a dedicated receive buffer full (RBF) bit at address 00BC to determine when the data field bytes should be read from the two CAN data receive registers RXD1 and RXD2 before the received bytes of data are overwritten. Alternatively, the CAN interface can be configured to generate an interrupt to the core processor to indicate to the core processor when the two receive registers RXD1 and RXD2 should be read. Although all messages longer than two bytes must be processed by software, messages having data fields not longer than two bytes are automatically retransmitted when required due to bus contention in accordance with the CAN protocol.

The CAN interface 21 of FIG. 4 includes interface management logic 36, a bit stream processor 37, transceiver logic 38, error management logic 39, a plurality of CAN registers 41, and an output drivers/input comparators circuit 40 which couples CAN interface 21 to the CAN but (See FIG. 3). The interface management logic 36 includes a state machine which executes transmission and reception commands issued by the core processor and which controls the transfer of data bytes between RX/TX registers 38C of the transceiver logic 38 and the RXD1, RXD2, TXD1 and TXD2 buffer registers of CAN register block 41. The interface management logic 36 also sets and resets the CAN status information and generates interrupts to the core processor 20.

The bit stream processor 37 includes a sequencer which controls a flow of data between the interface management logic 36 and the CAN bus. The bit stream processor 37 controls the transceiver logic 38 for receiving and transmitting messages and for bus arbitration functions. The bit stream processor 37 also generates error frames for transmission over the CAN bus in accordance with the CAN protocol.

The transceiver logic 38 includes bit time logic 38A cyclic redundancy check (CRC) generator/checker logic 38B, the RX/TX shift registers 38C, clock generator circuitry 38D, and bit stuff logic 38E. The clock generator 38D generates an internal clock by dividing the incoming clock CKI by a programmable value. The bit time logic 38A uses this internal clock to generate a receive and a transmit clock signal. The receive clock signal is synchronized to the CAN bus. The operation of the transceiver control state machine, the CRC generator/checker 38B and the RX/TX shift registers 38C are controlled by the bit stream processor 37. The cyclic redundancy check (CRC) generator/checker 38B consists of a 15-bit shift register and the logic required to generate a CRC checksum of the destuffed bitstream. It informs the error management logic 39 about the result of a received checksum. The checksum is generated by the polynomial:

$$X^{15}+X^{14}+X^{10}+X^{8}+X^{7}+X^{4}+X^{3}+1.$$

The RX/TX registers 38C are two 8-bit shift registers which perform parallel-to-serial conversion of information to be transmitted and serial-to-parallel conversion of information to be received. The TX shift register is loaded byte by byte first from TXD1 and then from TXD2 by the interface management logic 36. Received data bytes are similarly read one at a time from the RX shift register and placed into the receive data registers RXD1 and RXD2 in alternating fashion.

The error management unit 39 is responsible for fault confinement of the CAN protocol. The error management unit 39 receives errors announced by the bit stream processor 37 and informs bit stream processor 37, the transceiver logic 38 and the interface management logic 36 about the error state. Error management unit 39 includes transmit error counter (TEC) 39A and receiver error counter 39B (REC).

There are three states in which a CAN device can be operating with respect to error handling: error active, error passive and busoff. In the error active state, the CAN device participates in bus communication and transmits an active 'dominant' error flag (See FIG. 1C). In the error passive state, the CAN interface participates in bus communication but transmits a passive 'recessive' error flag upon detection of an error. A device is error passive when TEC 39A reaches an error count of greater than 127 and less than 256 or when REC 39B reaches an error count of greater than 127.

More specifically, when a receiver detects a bit error while sending an active error signal, REC 39B is incremented by eight. When a received detects a dominant bit as the first bit after sending an error flag, REC 39B is incremented by eight. After detecting the 14th consecutive dominant bit following an active error flag or overload flag or after detecting the 8th consecutive dominant bit following a passive error flag, REC 39B is incremented by eight. When receiving a stuff bit, a frame bit, a CRC bit or an acknowledge error, REC 39B is incremented by one. When a valid message is received, if the value of REC 39B is greater than zero, then REC 39B is decremented by one. When a transmitter detects a bit error during the sending of an active error flag, then TEC 39A is incremented by eight. After detecting the 14th consecutive dominant bit following an active error flag or overload flag or after detecting the 8th consecutive dominant bit following a passive error flag, TEC 39A is incremented by eight. When receiving a stuff bit, a frame bit, a CRC bit or an acknowledge error, TEC 39A is incremented by eight. When a valid message is received, if the value of TEC 39A is greater than zero, then TEC 39A is decremented by one.

An error condition that causes the device to enter the error passive state results in an active error flag being sent. Thereafter, while in the error passive state, passive error flags are sent when an error condition is encountered by the device. An error passive device becomes error active again when both the transmit and receive error counters have counts of less than 128. In the busoff state, the output drivers driving pins TX0 and TX1 are disabled and the device does not participate in any bus activity. A device is busoff when the transmit error counter is greater than 255. A busoff device will become error active again in one of two ways depending on which mode is selected through a fault confinement mode select bit (FMOD) located in a CAN bus control register (CBUS) of CAN registers 41. The transmit error counter switches the CAN interface to the busoff state when its count exceeds 255. The CAN bus control register (CBUS) has an address of 00BA on internal bus 25. The bits of the CBUS register are set forth in the below table.

both are set to 1, then the CAN interface will not start transmission or reception of a frame until eleven consecutive 'recessive' bits have been received. Resetting the TXEN1 and TXEN0 bits disables both the output drivers and the CAN input comparator 41. Preferably the core processor software resets the TXEN1 and TXEN0 bits to switch the CAN interface into the HALT mode in order to reduce current consumption and to assure proper resynchronization to the bus after exiting the HALT mode. A 'busoff' state causes output pins TX0 and TX1 to be tristated independent of the values of the TXEN1 and TXEN0 bits. The control signals TXEN0 and TXEN1 are illustrated in FIG. 4 controlling output line drivers which drive TX0 and TX1 pins 30 and 31 for ease of explanation and clarity of illustration. There are two ways in which the CAN interface switches to the error active state. More specifically, the CAN interface switches from the busoff state to the error active state by reception of 128*11 recessive bits. Alternately, the CAN interface switches out of reset to the error active state upon detecting 11 recessive bits, thus ensuring that the device is synchronized to the bus.

The RXREF1 bit controls whether or not the reference voltage is applied by voltage reference 35 and multiplexer 35A to one input of comparator 42 so that the other input will be coupled to pin RX1 33. If the RXREF1 bit is set to one, then the voltage reference is supplied to the comparator 42. The RXREF0 bit controls whether or not the reference voltage is applied to the comparator 42 via multiplexer 35B such that RX0 pin is coupled to the other input of comparator 42. If the RXREF0 bit is set to one, then the voltage reference is supplied to comparator 42.

The FMOD bit is used to select the fault confinement mode used as described above. The FMOD bit is set to '0' after a power on reset

TABLE 1

| Bit 7 | Bit 6 | Bit 5 | Bit 4 | Bit 3 | Bit 2 | Bit 1 | Bit 0 |
|---|---|---|---|---|---|---|---|
| CMPTST | RIAF | TXEN1 | TXEN0 | RXREF1 | RXREF0 | TSTPLA | FMOD |
| 1 | 0 | 0 | 0 | 0 | 0 | 0 | 0 |
| R/W | R/W | R/W | R/W | R/W | R/W | R/W | R/W |

If the CAN bus control register CMPTST bit is set, then the receiver comparator 42 is internally connected to the TX0 pin 30 for test purposes. The CMPTST bit only has an effect during the test mode. During normal operation, the CMPTST bit can be used as a general purpose flag bit. The meaning of the TXEN0 and TXEN1 output driver enable bits are set forth in the table below.

TABLE 2

| TXEN1 | TXEN0 | Output |
|---|---|---|
| 0 | 0 | TX0, TX1 tri-stated, CAN input comparator disabled |
| 0 | 1 | TX0 enabled |
| 1 | 0 | TX1 enabled |
| 1 | 1 | TX0 and TX1 enabled |

Resetting the TXEN1 and TXEN0 bits in bus control 35 register (CBUS) will disable the output drivers and will initiate resynchronization to the CAN bus. During such a resynchronization, all other CAN related registers and flags are unaffected. Bus resynchronization is performed using the TXEN1 and TXEN0 bits. If the transmit output was disabled (TXEN1,TXEN0='0') and either TXEN1 or TXEN0, or The transmit control/status register (TCNTL) has an address of 00BB. The bits of this register are set forth in the below table.

TABLE 3

| Bit 7 | Bit 6 | Bit 5 | Bit 4 | Bit 3 | Bit 2 | Bit 1 | Bit 0 |
|---|---|---|---|---|---|---|---|
| NS1 | NS0 | TERR | RERR | CEIE | TIE | RIE | TXSS |
| 0 | 0 | 0 | 0 | 0 | 0 | 0 | 0 |
| R | R | R/W | R/W | R/W | R/W | R/W | R/W |

The meaning of the node status bits NS1 . . NS0 is set forth in the table below. The node status bits can be read but cannot be written by the core processor.

TABLE 4

| NS1 | NS0 | Output |
|---|---|---|
| 0 | 0 | Error active |
| 0 | 1 | Error passive |
| 1 | 0 | Busoff |
| 1 | 1 | Busoff |

The CAN error interrupt enable bit (CEIE) is a bit set by software executing in the core processor in order to enable transmit error and receive error interrupts. The error interrupt pending flag bits are the TERR and RERR bits.

The transmit error bit TERR is automatically set when an error occurs during transmission of a frame. The TERR bit can be programmed to generate an interrupt to the core processor by setting the CAN error interrupt enable bit (CEIE).

If an error occurs during the transmission of a frame having more than two data bytes, software executing in the core processor must handle the correct reloading of the data bytes into the TXD1 and TXD2 registers for retransmission of the frame. For frames with two or fewer data bytes, the interface management logic block 36 performs an automatic retransmission. Regardless of the number of data bytes in the frame, the software executing in the core processor must reset the TERR bit if the CEIE bit is enabled in order to prevent a false interrupt from being generated immediately upon the core processor software's return from the error interrupt service routine.

The receive error bit (RERR) is automatically set when an error occurred during the reception of a frame. The RERR bit can be programmed to generate an interrupt by setting the CAN error interrupt enable bit (CEIE). As in the case of the TERR bit, the RERR bit must be cleared by the software executing in the core processor to prevent a false interrupt from being generated immediately upon a return from the error interrupt service routine.

The transmit interrupt enable bit (TIE) is another bit which may be set by software executing in the core processor. Setting this bit enables a transmit buffer empty TBE interrupt to the core processor. The TBE interrupt is generated after an odd data byte has been transmitted. At this time, the subsequent even data byte has been loaded into the TX shift register 38C. The contents of the two TXD1 and TXD2 registers may be changed. The TXD1 register must, however, be written when an additional byte is to be transmitted, before the subsequent even byte has been shifted out of the TX shift register 38C, and before the TX shift register 38C reads the TXD1 register for another data byte to transmit. If the TXD1 register is not written in time, the TX shift register will be loaded with the previous data byte already transmitted rather than the next data byte in the frame. When two additional data bytes are to be transmitted, new bytes may be written into TXD1 and TXD2 at approximately the same time to prevent the TX shift register from being loaded with old data bytes.

The receive interrupt enable bit (RIE) is another bit which may be set by software executing in the core processor. Setting this bit enables a receive buffer full RBF interrupt. In similar fashion to the TXD1 and TXD2 registers, the RXD1 and RXD2 registers must be read after a RIE interrupt is generated and before the RX shift register 38C overwrites the RXD1 and RXD2 registers with the subsequent data bytes of the frame.

Figure 5:
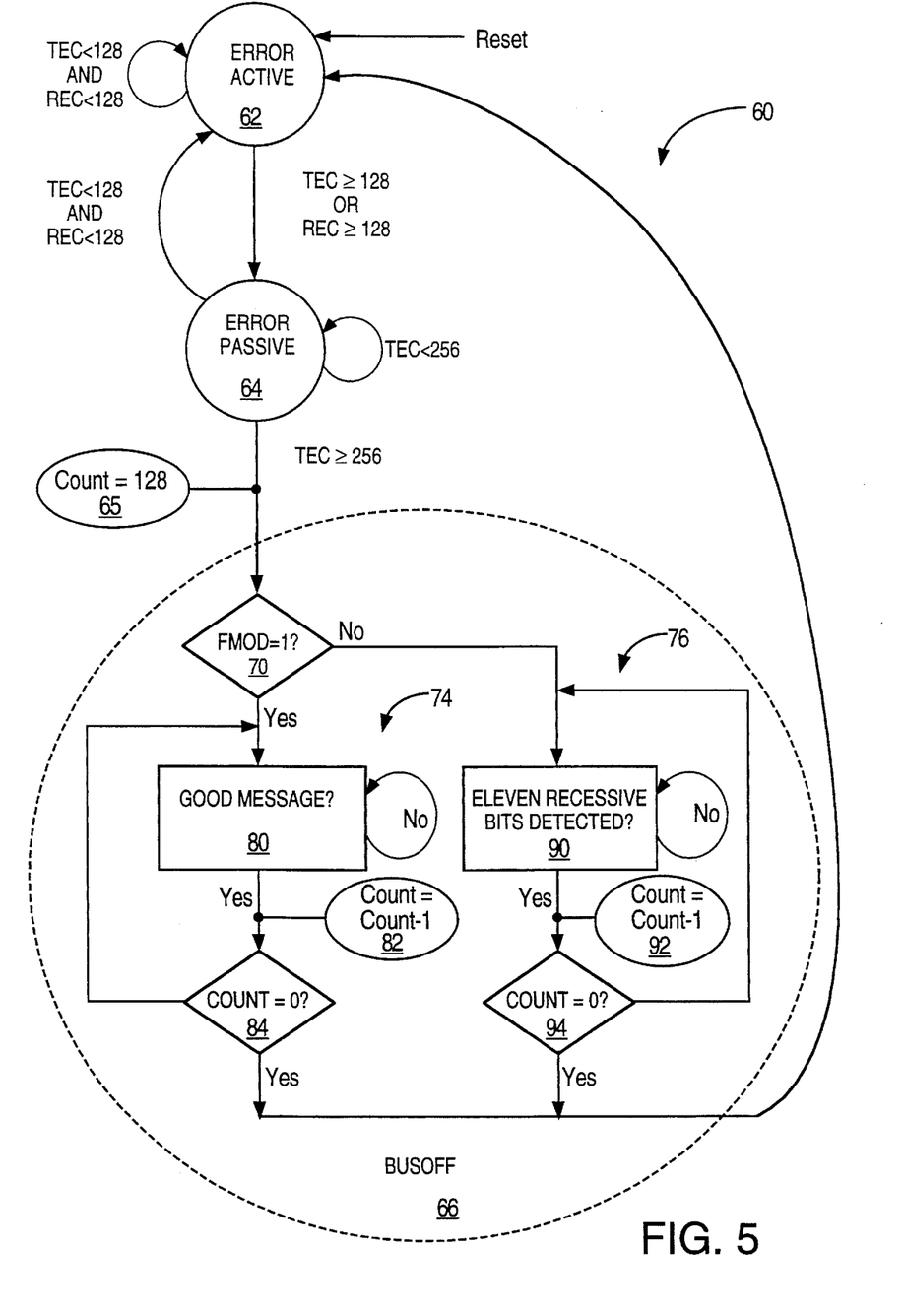
FIG. 5 is a state diagram of an enhanced fault tolerant system of a CAN node in accordance with the present invention.

Referring to FIG. 5, error management unit 39 includes circuitry which implements state machine 60. When error management unit 39 detects an active reset signal, error management unit 39 enters error active state 62. When error management unit 39 is in error active state 62, error management unit 39 sends six dominant bits during the sending of an error frame. Error management unit 39 remains in error active state 62 while transmit error counter 39A is less than 128 and receive error counter 39B is less than 128. TEC 39A being less than 128 indicates that the node has not transmitted enough errors or bad messages to warrant the node going into the error passive state where the sending of passive error flags will not dominate bus activity. I.e., it will start sending less obtrusive error flags when the TEC exceeds 128. REC 39B being less than 128 indicates a measure of the nodes inability to receive messages. When this count is less than 128, it is not severe enough to warrant going to the less obtrusive error passive state. Either REC 39A or TEC 39B exceeding 128 forces the node into the error passive state.

When the count of TEC 39A is greater than or equal to 128 or the count of REC 39B is greater than or equal to 128 then, state machine 60 transfers to error passive state 64. While in error passive state 64, error management unit 39 sends six recessive bits during the sending of an error frame. State machine 60 remains in error passive state 64 as long as the count of TEC 39A is greater than or equal to 128 and less than 256 and the count of REC 39B is greater than or equal to 128. If the count of both TEC 39A and REC 39B is less than 128 then state machine 60 transfers to error active state 62. If the count of TEC 39A exceeds 255, then error management unit 39 sets the busoff counter to 128 and state machine 60 transfers to busoff state 66. When REC 39B counts to 128, it stops. Accordingly, when state machine 60 transitions to the busoff state, REC 39B functions as the busoff counter because it is initialized to count to 128 and it is not used for counting received errors when state machine 60 transitions to the busoff state.

State machine 60 remains in busoff state 66 until one of two conditions occurs. If the FMOD bit is set, then state machine 66 remains in busoff state 66 until 128 good messages are received by CAN interface circuit 21. If the FMOD bit is cleared, then state machine 66 remains in busoff state 66 until 128*11=1408 recessive bits are detected by can interface circuit 21. When either of these conditions occur, control transfers back to error active state 62.

More specifically, busoff state 66 includes a plurality of states. When error management unit 39 enters busoff state 66, busoff state 66 first determines, at fault confinement determination state 70, whether the FMOD bit which is stored in the CBUS register of CAN interface unit 21 is set or cleared. If the FMOD bit is set, indicating that error management unit 39 should invoke its enhanced fault confinement mode, then control transfers to enhanced fault confinement portion 74 of busoff state 66. If the FMOD bit is cleared, indicating that error management unit 39 should invoke its normal fault confinement mode, then control transfers control to fault confinement portion 76. Fault confinement portion 76 provides an operating mode which is downwardly compatible with devices which do not include enhanced fault confinement capabilities.

When control passes to enhanced fault confinement portion 74, control first passes to good message determination state 80. When good message determination state 80 determines that a good message has either been sent or received, control passes to decrement counter state 82 in which error management unit 39 decrements REC 39B, which is functioning as the busoff counter and transfers control to busoff count determination state 84. In busoff count determination state 84, error management unit 39 determines whether the busoff count equals zero. If the count equals zero then error management unit 39 transfers control from busoff state 66 to error active state 62. If the busoff count does not equal zero, then error management unit 39 remains in the busoff state, and more specifically, control passes to good message determination state 80. Accordingly, with the combination of enhanced fault confinement portion 74 and decrementing REC 39B which is functioning as the busoff counter, busoff state machine 66 determines when 128 good messages have been received by bus interface unit 21 before transferring control to error active state 62.

Control passes to fault confinement portion 76 when the FMOD bit is cleared and error management unit 39 enters busoff state 72. More specifically, when control passes to fault confinement portion 76, control passes to recessive bit determination state 90, which determines when bus interface unit 21 receives a recessive bit. When recessive bit determination state 90 determines that bus interface unit 21 has received a recessive bit, a module 11 counter is incremented. When the module 11 counter determines that the recessive bit count equals eleven, error management unit 39 decrements the busoff counter at decrement busoff counter state 92 and control passes to busoff count determination state 94. In busoff count determination state 94, error management unit 39 determines whether the busoff count equals zero. If the count equals zero then error management unit 39 transfers control from busoff state 66 to error active state 62. If the busoff count does not equal zero, then error management unit 39 remains in the busoff state, and more specifically, control passes to recessive bit determination state 90. Accordingly, with the combination of fault confinement portion 76 and decrementing REC 39B functioning as the busoff counter, busoff state machine 70 determines when 128*11 groups of recessive bits have occurred before transferring control to error active state 62.

Figure 6:
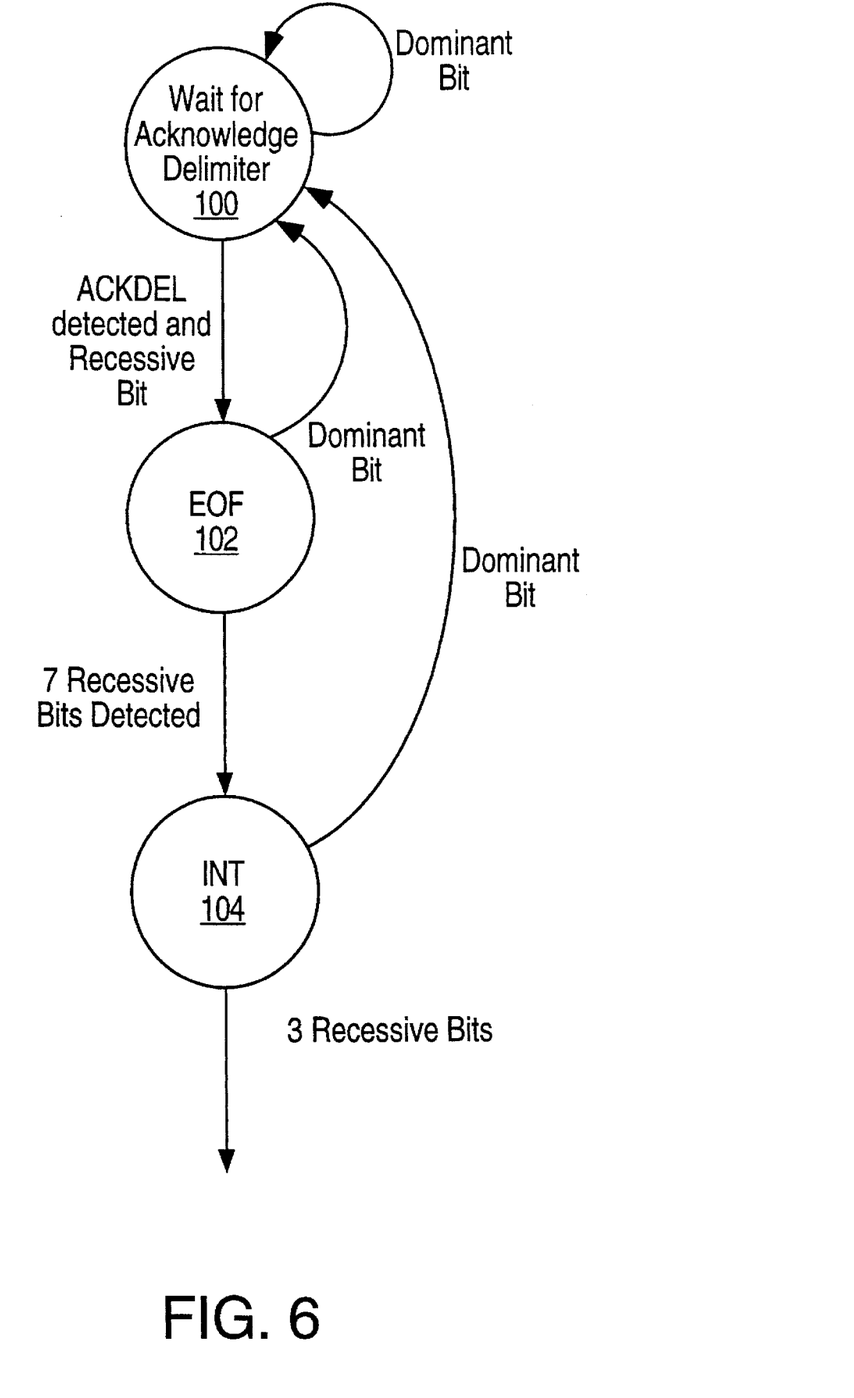
FIG. 6 is a state diagram of a good message state of the FIG. 5 state diagram in accordance with the present invention.

Referring to FIG. 6, good message determination state 80 includes a plurality of states. More specifically, during good message determination state 80, error management unit 39 first transfers control to Acknowledge delimiter monitor state 100 which waits to receive one recessive bit, which is the acknowledge delimiter bit. After the acknowledge delimiter recessive bit is received, control passes to end of frame monitor state 102. During end of frame monitor state 102, error management unit 39 determines when the 7 recessive bits, indicating the end of a frame, are received by CAN interface unit 21. After the 7 recessive bits have been detected, control passes to intermission monitor state 104. During intermission state 104, error management unit 39 determines when the 3 recessive intermission bits are received, indicating that a complete and correctly decoded message, including stuff bits, fixed bits and CRC, has been received by the node. I.e., that a good message has been correctly received. After 3 recessive bits are detected, then error management unit 39 issues a good message signal and transfers control to decrement counter state 82. If, when error management unit 39 is in any of the good message determination states, a dominant bit is detected by error management unit 39, which indicates that this is not the end of a good message, then control remains or returns to Acknowledge delimiter state 100, and the process of monitoring for a good message is reinitiated.

Other Embodiments

Other embodiments are within the following claims.
What is claimed is:

1. A controller area network (CAN) interface unit comprising
   a bit stream processor, the bit stream processor announcing when errors are received from a CAN bus;
   error management logic coupled to the bit stream processor, the error management logic receiving errors announced by the bit stream processor, determining in which of a plurality of error states the CAN interface is operating and informing the bit stream processor of which of a plurality of states the CAN interface is operating, the states including
      an error active state in which the CAN interface participates in bus communication and transmits a dominant error flag,
      an error passive state in which the CAN interface participates in bus communication and transmits a recessive error flag, the error active state transitioning to the error passive state when an error count is greater than or equal to a first predetermined number, and
      a busoff state in which the CAN interface does not participate in CAN bus activity, the error active state transferring control to the busoff state when a count is greater than or equal to a second predetermined number, the second predetermined number being greater than or equal to the first predetermined number, the busoff state transitioning to the error active state using a fault recovery method selected from between a first fault recovery method and a second fault recovery method, the first fault recovery method transitioning to the error active state after receiving a predetermined number of recessive bits by the CAN interface and the second fault recovery method transitioning to the error active state after receiving a predetermined number of good CAN frames, a good CAN frame including an acknowledge delimiter, an end of frame message and an intermission message.

2. The CAN interface unit of claim 1 wherein
   the acknowledge delimiter includes a recessive bit, and
   the error management logic counts occurrences of the recessive bit.

3. The CAN interface unit of claim 1 wherein
   the end of frame message includes a plurality of recessive bits, and
   the error management logic counts the plurality of recessive bits.

4. The CAN interface unit of claim 1 wherein
   the intermission message includes a plurality of recessive bits, and
   the error management logic counts the plurality of recessive bits.

5. A method of providing a controller area network (CAN) node of a CAN system with a fault recovery feature comprising:
   setting the CAN node to a busoff state when an error is detected by the CAN node;
   determining whether to use a first or a second fault recovery method;
   the first fault recovery method including
      detecting when a predetermined number of recessive bits have been received by the CAN node; and
      setting the CAN node to an error active state when the predetermined number of recessive bits have been received by the CAN node;
   the second fault recovery method including
      receiving a plurality of CAN frames;
      detecting when good CAN frames are received by the CAN node; and
      setting the CAN node to an error active state when a predetermined number of good CAN frames are detected, a good CAN frame including an acknowledge delimiter, an end of frame message and an intermission message; and performing one of the first and second fault recovery methods based upon the determining step.

6. The method of claim 5 wherein the acknowledge delimiter includes a recessive bit and, the good CAN frame detecting step includes the step of counting occurrences of the recessive bit.

7. The method of claim 5 wherein the end of frame message includes a plurality of recessive bits and, the good CAN frame detecting step includes the step of counting the plurality of recessive bits.

8. The method of claim 5 wherein the intermission message includes a plurality of recessive bits and, the good CAN frame detecting step includes the step of counting the plurality of recessive bits.

\* \* \* \* \*